United States Patent
Shi et al.

(10) Patent No.: US 6,356,433 B1
(45) Date of Patent: Mar. 12, 2002

(54) CONDUCTING POLYMER ULTRACAPACITOR

(75) Inventors: Steven Z. Shi, Latham, NY (US); John R. Davey, Los Alamos, NM (US); Shimshon Gottesfeld, Los Alamos, NM (US); Xiaoming Ren, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/653,621

(22) Filed: Aug. 31, 2000

Related U.S. Application Data

(60) Provisional application No. 60/186,705, filed on Mar. 3, 2000, now abandoned.

(51) Int. Cl.$^7$ .................................................. H01G 9/00
(52) U.S. Cl. ...................................... 361/502; 361/504
(58) Field of Search ............................... 361/502, 503, 361/504, 505, 512, 518; 29/25.03

(56) References Cited

U.S. PATENT DOCUMENTS

| | | | |
|---|---|---|---|
| 4,488,203 A | 12/1984 | Muranaka et al. | |
| 4,986,886 A | 1/1991 | Wei et al. | 204/78 |
| 5,132,049 A | 7/1992 | Garreau et al. | 252/500 |
| 5,268,448 A | 12/1993 | Buechner et al. | 528/380 |
| 5,527,640 A | 6/1996 | Rudge et al. | 204/252 |
| 5,591,318 A | 1/1997 | Li et al. | 205/210 |
| 5,626,729 A | 5/1997 | Thompson et al. | 204/252 |
| 5,637,421 A | 6/1997 | Poehler et al. | 429/190 |
| 5,714,053 A | * 2/1998 | Howard | 205/220 |
| 5,733,683 A | 3/1998 | Searson et al. | 429/213 |
| 5,751,541 A | 5/1998 | Li et al. | 361/525 |
| 5,811,205 A | 9/1998 | Andrieu | 429/137 |
| 5,973,913 A | * 10/1999 | McEwen et al. | 361/523 |
| 6,205,016 B1 | * 3/2001 | Niu | 361/503 |

OTHER PUBLICATIONS

Yen Wei et al., "Electrochemical Polymerization of Thiophenes in the Presence of Bithiophene or Terthiophene: Kinetics and Mechanism of the Polymerization," Chem. Mater., 3, pp. 888–897, 1991.

* cited by examiner

Primary Examiner—Anthony Dinkins
(74) Attorney, Agent, or Firm—Ray G. Wilson

(57) ABSTRACT

A sealed ultracapacitor assembly is formed with first and second electrodes of first and second conducting polymers electrodeposited on porous carbon paper substrates, where the first and second electrodes each define first and second exterior surfaces and first and second opposing surfaces. First and second current collector plates are bonded to the first and second exterior surfaces, respectively. A porous membrane separates the first and second opposing surfaces, with a liquid electrolyte impregnating the insulating membrane. A gasket formed of a thermoplastic material surrounds the first and second electrodes and seals between the first and second current collector plates for containing the liquid electrolyte.

6 Claims, 7 Drawing Sheets

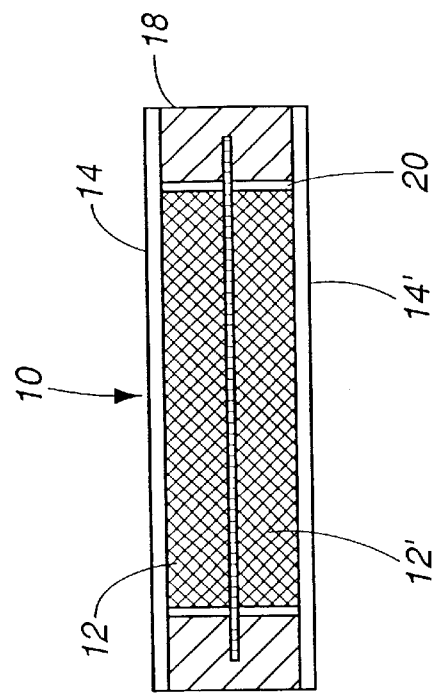
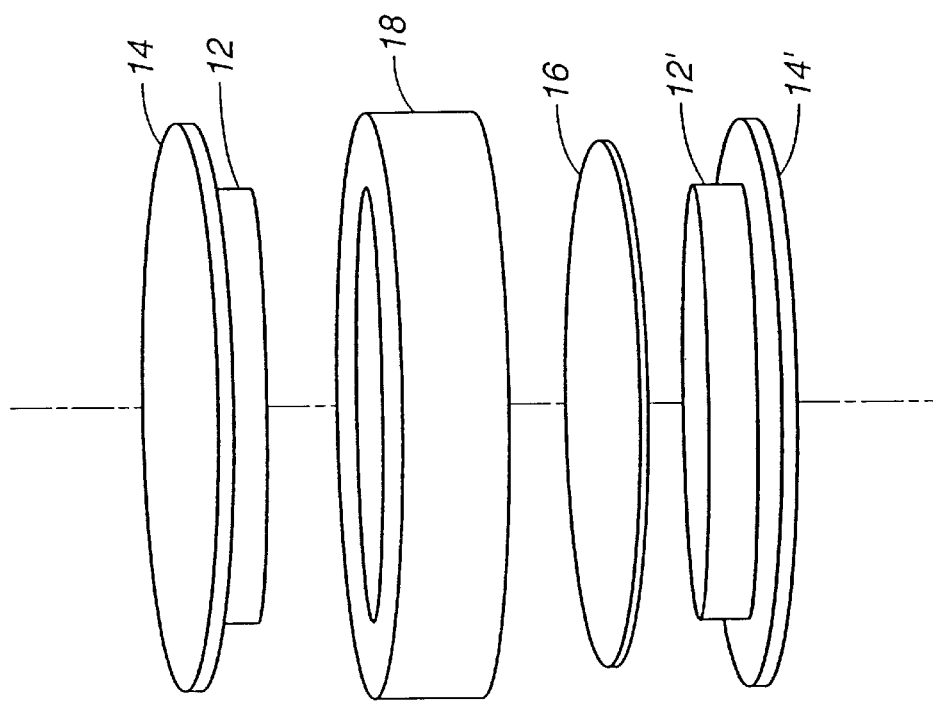
Fig. 1B
Fig. 1A

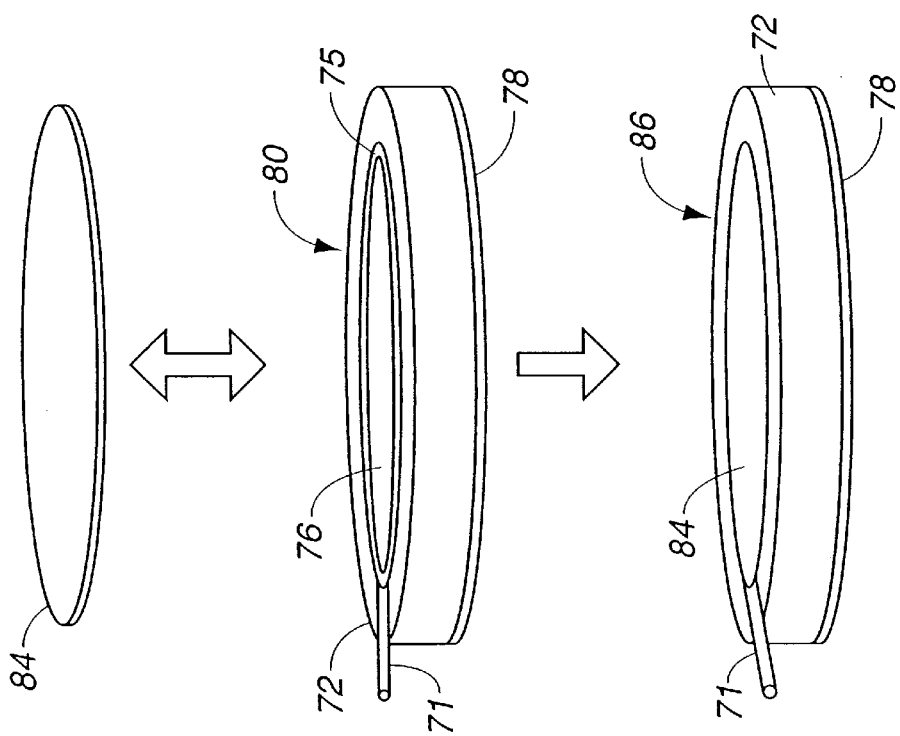
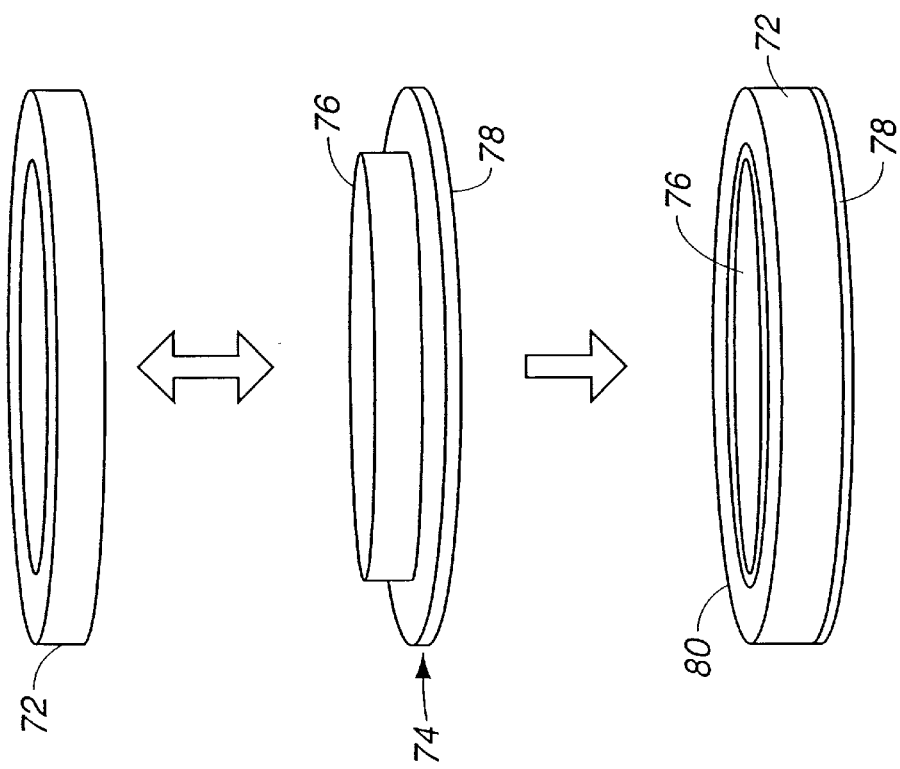
Fig. 5B
Fig. 5A

CONDUCTING POLYMER ULTRACAPACITOR

RELATED APPLICATIONS

This application claims the benefit of provisional application 60/186,705 filed Mar. 3, 2000 now abandoned.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to ultracapacitors with polymer active materials, and, more particularly, to a method for fabricating polymer ultracapacitors.

BACKGROUND OF THE INVENTION

Electrochemical capacitors, also called supercapacitors or ultracapacitors, are energy storage devices which can store more energy than traditional capacitors and discharge this energy at higher rates than rechargeable batteries. In addition, the cycle life of electrochemical capacitors should far exceed that of a battery system. Ultracapacitors are attractive for potential applications in emerging technology areas that require electric power in the form of pulses. Examples of such applications include digital communication devices that require power pulses in the millisecond range, and traction power systems in an electric vehicle where the high power demand can last for seconds up to minutes.

Battery performance and cycle life deteriorate severely with increasing power demand. A capacitor-battery combination has been proposed where the capacitor handles the peak power and the battery provides the sustained load between pulses. Such a hybrid power system can apparently improve the overall power performance and extend battery cycle life without increase in size or weight of the system.

An ultracapacitor is basically the same as a battery in terms of general design, the difference being that the nature of charge storage in the electrode active material is capacitive, i.e., the charge and discharge processes involve only the movement of electronic charge through the solid electronic phase and ionic movement through the solution phase. Energy densities of ultracapacitors are much higher than those of conventional capacitors, but typically lower than those of advanced batteries. However, compared to batteries, higher power densities and longer cycle life have been either demonstrated or projected. These latter advantages of ultracapacitors over batteries are achievable because no rate-determining and life-limiting phase transformations take place at the electrode/electrolyte interface.

The dominant ultracapacitor technology has been based on double-layer type charging at high surface area carbon electrodes, where a capacitor is formed at the carbon/electrolyte interface by electronic charging of the carbon surface with counter-ions in the solution phase migrating to the carbon in order to counterbalance that charge.

Conducting polymers have been investigated for use in ultracapacitors. Higher energy densities can be achieved because charging occurs through the volume of the active polymer material rather than just at the outer surface. When a conducting polymer is being p-doped (positively charged), electrons leave the polymer backbone generating an excess of positive charge; anions from the electrolyte solution migrate into the polymer matrices to counter the positive charge. In the case of n-doping of conducting polymers, the polymer backbone becomes negatively charged by the addition of electrons from the external circuit; cations enter the polymer matrices from solution to balance the negative charge.

An object of the present invention is to provide an ultracapacitor that is compact and lightweight. The present invention also provides methods of electrode fabrication, cell assembly and packaging.

RELATED ART

| | |
|---|---|
| U.S. Pat. No. 5,591,318 | 1/1997 Li et al., Method of Fabricating a Conductive Polymer Energy Storage Device. |
| U.S. Pat. No. 5,811,205 | 9/1998 Andrieu et al., Bifunctional Electrode for an Electrochemical or a Supercapacitor and a Method of Producing It. |
| U.S. Pat. No. 5,751,541 | 12/1998 Li et al., Polymer Electrodes for Energy Storage Devices and Method of Making Same. |
| U.S. Pat. No. 5,714,053 | 2/1998 Howard, Conducting Polymer Electrodes for Energy Storage Devices and Method of Making Same. |
| U.S. Pat. No. 5,637,421 | 10/1997 Poehler et al., Completely Polymeric Charge Storage Device and Method for Producing Same. |
| U.S. Pat. No. 4,488,203 | 12/1984 Muranaka et al., Electrochemical Double-Layer Capacitor and Film Enclosure. |

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a sealed ultracapacitor assembly. First and second electrodes are formed of first and second conducting polymers electrodeposited on porous carbon paper substrates, where the first and second electrodes each define first and second exterior surfaces and first and second opposing surfaces. First and second current collector plates are bonded to the first and second exterior surfaces, respectively. A porous membrane separates the first and second opposing surfaces, with a liquid electrolyte impregnating the porous membrane. A gasket formed of a thermoplastic material surrounds the first and second electrodes and seals between the first and second current collector plates for containing the liquid electrolyte.

In another characterization of the invention, a method is presented for forming a sealed ultracapacitor. First and second carbon disk electrodes are bonded on first and second current collector plates, respectively, and conducting polymer active material is electrodeposited onto the first and second carbon paper disk electrodes to produce first and second capacitor electrodes. First and second gasket seal rings are bonded to the first and second current collectors. A porous separator is sealed to the first gasket seal ring to cover the polymer active material on the first capacitor electrode. A first electrolyte fill tube is inserted between the separator and the first gasket seal ring on the first capacitor electrode. The second gasket seal ring is aligned facing the first gasket seal ring and a second electrolyte fill tube is inserted between the first and second gasket seal rings. The first and second gasket seal rings are then bonded together. A liquid is introduced through the first electrolyte fill tube while drawing a vacuum on the second electrolyte fill tube to impregnate the porous separator with the electrolyte. The first and second electrolyte fill tubes are then sealed to form the sealed ultracapacitor.

BRIEF DESCRIPTION OF THE DRAWINGS

The accompanying drawings, which are incorporated in and form a part of the specification, illustrate embodiment of the present invention and, together with the description, serve to explain the principles of the invention. In the drawings:

FIGS. 1A and 1B are exploded and cross-sectional views of an ultracapacitor according to one embodiment of the present invention.

FIGS. 5A and 5B illustrate a process step for adding sealing gaskets and fill tubes to the electrode structures after polymer deposition.

DETAILED DESCRIPTION

Figure 2B:
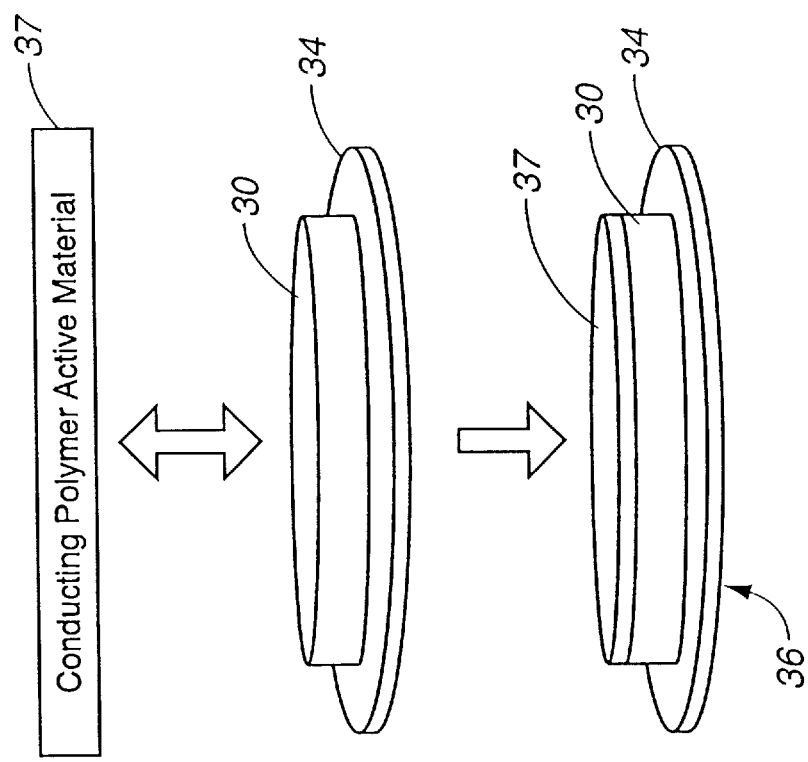
FIGS. 2A and 2B illustrate process steps for forming electrode structures for the ultracapacitor shown in FIGS. 1A and 1B.

In one embodiment of the present invention, an ultracapacitor device comprises a single cell, having a voltage of 3 V at full charge. Referring now to FIGS. 1A and 1B, there are shown an exploded view and a cross sectional view respectfully, of a single-cell ultacapacitor device 10, which includes a pair of disk shaped electrodes 12,12' bonded to current collector plates 14,14', a separator 16 sandwiched between the two electrodes, a gasket 18 heat-sealed around the periphery of separator 16 and between current collectors 14,14', and an impregnating electrolyte solution 20.

Electrodes 12,12' comprise a conducting polymer active material electrodeposited onto a porous carbon paper substrate. Lightweight, highly conductive fibrous carbon paper (e.g., carbon paper from Spectracarb 2050A, 80% porosity, 0.25 g/cc, Spectracorp, MA) is preferred as the electrode substrate. This substrate provides a porous structure template that allows a significant volume of polymer to be deposited as thin films on the carbon fibers, resulting in a large polymer surface area that is accessible by an electrolyte. An active ultracapacitor electrode formed in this manner has strong advantages over structure based on pressed powder, providing high electronic conductivity through the carbon paper structure, as well as high ionic accessibility. The result is higher available power densities. The carbon paper thickness can be varied in the range of about 100 $\mu$m to 800 $\mu$m depending on the desired application.

In order to achieve enhanced specific energy and power, an important objective in cell design and packaging is to minimize the mass and volume of inactive components. Current collector plates 14,14' are made of a thin electronically conductive film, which is electrochemically stable, lightweight, and has negligible solvent and ionic permeability. In a preferred embodiment of the present invention, the current collectors are prepared from a 100 $\mu$m thick Rexam conductive plastic film (COER, Rexam Graphics, MA). Gasket seal 18 is prepared from heat-sealable thermoplastic material, which is chemically inert to the electrolyte solution 20, lightweight, and is heat-sealable to materials selected for both current collectors 14,14' and separator 16. A preferred heat-sealable material is polyolefin film with various thicknesses.

A key requirement for enhanced energy cycle efficiency and delivery of maximum power is a low cell equivalent series resistance (ESR). It is found that the separator 16 is the largest single source of cell ESR. Therefore a suitable separator 16 has high ionic conductivity when soaked with electrolyte and has minimum thickness. According to one embodiment of the invention, separator 16 is prepared from a 25 $\mu$m thick Solupor membrane (DSM 7P03, DSM 7P20, DSM Solutech, The Netherlands).

Electrolyte 20 preferably is formed from a tetraalkylammonium salt that is highly soluble in acetonitrile, is stable over a wide voltage window, and has highly mobile anions and cations for p- and n-doping/undoping processes. The preferred electrolytes that satisfy these criteria are tetramethylammonium trifluoromethanesulfonate $Me_4NCF_3SO_3$, tetraethylammonium trifluoromethanesulfonate $Et_4NCF_3SO_3$, and tetraethylammonium tetrafluoroborate $Et_4NBF_4$.

In a single-cell device 10, both electrodes 12,12' can be fabricated with the same conducting polymer active material, to provide a symmetric electrode configuration. Alternatively, a capacitor may have an asymmetric electrode configuration, in which each electrode is formed of a different conducting polymer active material. A symmetric device, the preferred embodiment, is easier to fabricate than an unsymmetric device. The symmetric device also allows the polarity of the two electrodes to be reversed, a possible advantage for continuous high performance during long-term charge cycling. However, an unsymmetric device may be selected where the choice of electrode material is determined by cost and performance. Then the best and most cost effective conducting polymer that exhibits p-doping may not be the most suitable material for n-doping. A preferred conducting polymer has a backbone of polythiophene. Suitable polymers include all modified polythiophenes where a phenyl, substituted phenyl or other aryl group has been attached to the thiophene in the 3-position, e.g., poly(3-(4-fluorophenyl)thiophene) (PFPT).

Figure 2A:
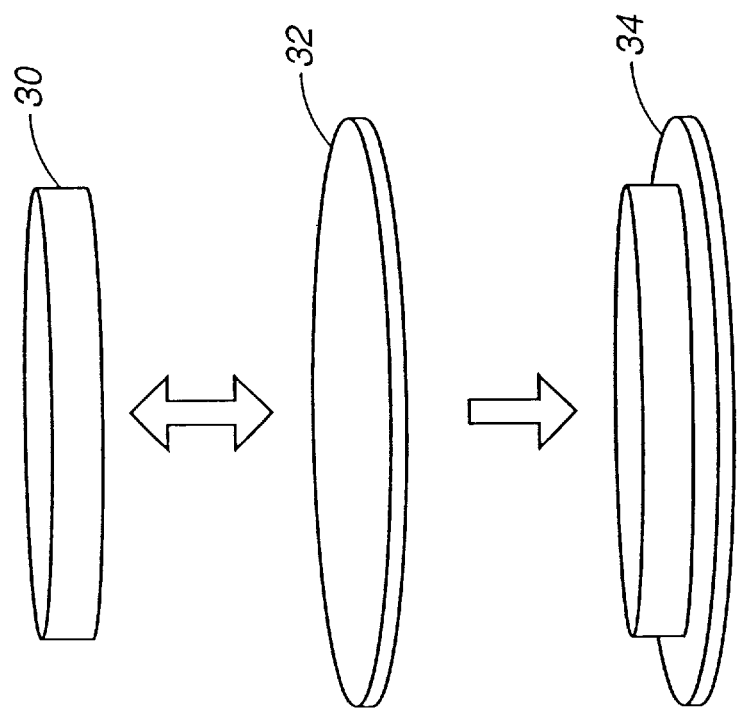

Referring now to FIGS. 2A and 2B, the electrode fabrication process includes first bonding a carbon paper disk electrode 30 on a current collector plate 32 (FIG. 2A), and then electrodepositing conducting polymer active material 37 onto the one-side bonded carbon paper electrode 34 to produce a capacitor electrode 36 (FIG. 2B). One method of bonding the carbon paper electrode to the current collector is by applying graphite-filled epoxy. In one embodiment, a graphite-epoxy mixture is prepared by mixing 51% by weight of purified graphite powder (2–15 micron, 99.99%) to 41% by weight of epoxy resin and 8% epoxy hardener (Mager Scientific Inc). The mixture is best if used within 20 minutes of mixing. A carbon paper disc 30 and a current collector disk 32 are prepared with desired diameters. A stainless steel (or any other heat resistant material) (not shown) washer is placed on the top of current collector disc 32. The washer is slightly thinner than carbon paper 30, and has an outer diameter the same as that of current collector (e.g., Rexam conductive film) disc 32, and an inner diameter the same as that of carbon paper 30. A very thin layer of the graphite-epoxy mixture is applied on one side of the carbon paper 30. Carbon paper 30 is then placed in the center of the stainless steel washer with the graphite-epoxy coated side facing current collector disc 32. The above assembly is then sandwiched between two Teflon sheets and cured for 10 minutes at 140° C. under 5 psi pressure. Alternatively, if Rexam conductive film is used as current collector 32, a thermal fusion method can be used to bond carbon paper 30 to current collector 32. This method includes using a well controlled hot roller, processing for 2 seconds at 150° C., under certain pressure. The hot roller pressure should be adjusted carefully so that carbon paper 30 will not be damaged.

After bonding carbon paper 30 on current collector 32, the next step of electrode fabrication is electropolymerizing a conducting polymer active material onto carbon paper 30. In an electropolymerization process, the conducting polymer active material 37 is electrochemically deposited, by anodic oxidation of the monomer, directly onto the electrode substrate (carbon paper 30).

Figure 3:
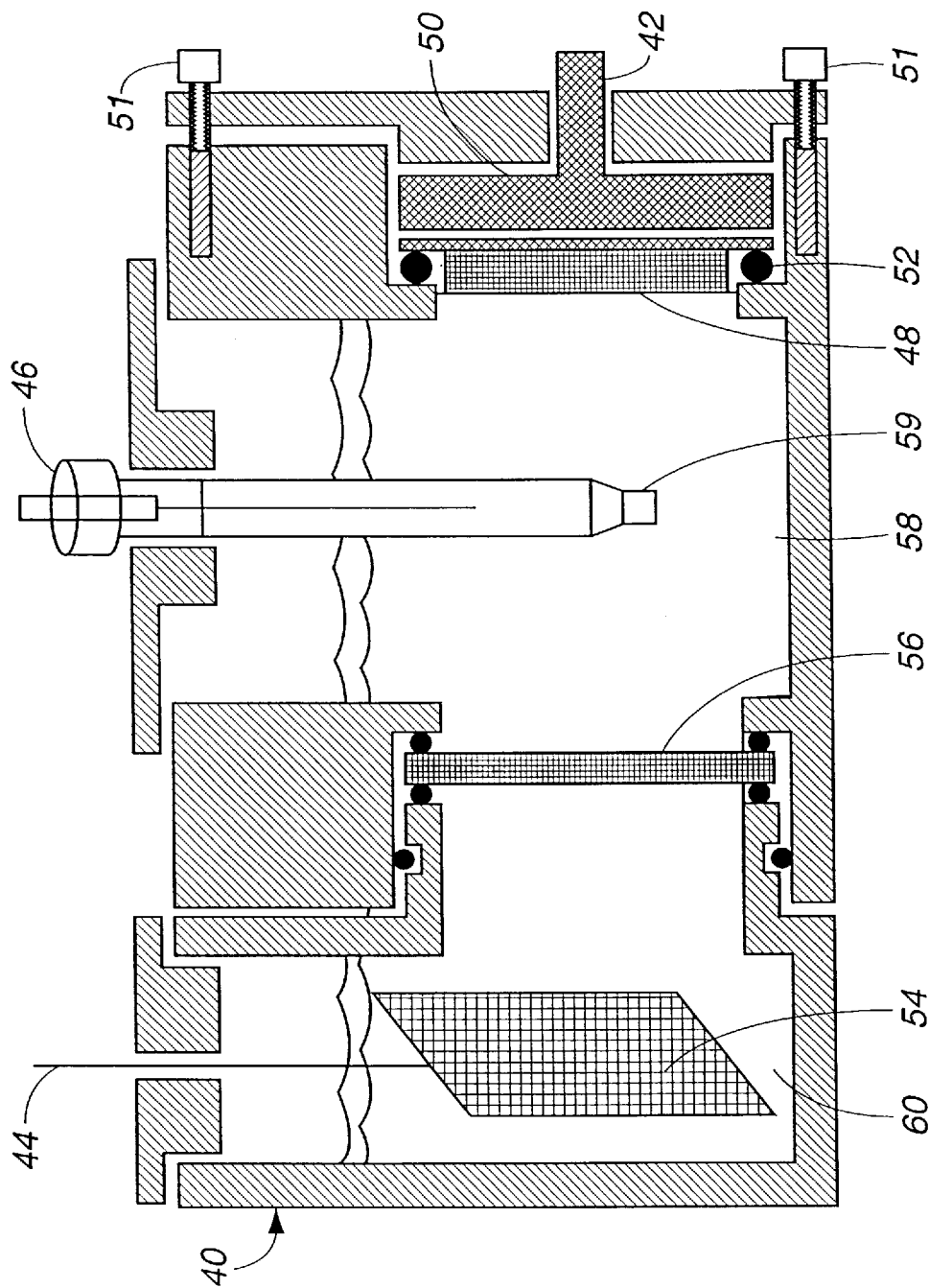
FIG. 3 is a cross-sectional view of an electrodeposition apparatus for forming conductive polymer electrodes for use in the present invention.

Electropolymerization is carried out in a polymerization-cell 40 shown in FIG. 3. The polymerization cell contains working electrode 42, counter electrode 54 and reference electrode 46. Working electrode 42 includes assembly 48 of a carbon paper disk electrode bonded to a current collector, the same as 34 in FIG. 2A. A gold plated stainless steel disc plate 50 is electrically connected with working electrode 42 and is compressed against the back side of the electrode assembly 48 to provide good electric contact. An electrolyte seal is achieved by employing silicon rubber O-ring 52, which is compressed by side screws 51. Counter electrode 54 was made of relatively thick carbon paper connected to platinum wire 44. Counter electrode compartment 60 is separated from working electrode compartment 58 by porous glass frit 56. Reference electrode 46 is a non-aqueous Ag/Ag+ electrode, which is also separated from working electrode compartment 58 by porous glass plug 59. The electrolyte solution in working electrode compartment 58 is formed of electropolymerizable monomer(s) and a supporting electrolyte dissolved in a solvent. The electrolyte solution in the counter electrode compartment 60 contains only a supporting electrolyte dissolved in a solvent (e.g., acetonitrile).

An important objective in the fabrication of conducting polymer electrodes for ultracapacitors is to facilitate ionic mobility within the volume of the deposited polymer material. Electropolymerization can provide excellent control over the morphology and quality of the polymer formed by adjusting electropolymerization conditions, including electrical parameters, the nature of the electrolyte solution and the electrode substrate material. Electropolymerization of the monomer can be performed by controlling either the electrode current (constant current, pulse current) or the electrode potential (constant potential or cycling potential). In a preferred embodiment, conducting polymer is electrodeposited onto the carbon paper electrode (see carbon paper 30, FIG. 2A) at constant anodic current from a solution containing the relevant monomer(s). This galvanostatic polymer growth technique enables accurate control of the amount of polymer deposited, because the electrodeposited polymer mass is proportional to the polymer growth charge, i.e., the total charge passed during electropolymerization.

During electropolymerization, anions from the electrolyte solution are inserted into the polymer matrices to maintain charge neutrality, and, thus strongly affect the morphology of the polymer. Larger anions in electropolymerization will create larger pores in the polymer and thus a more open nano-structure. Therefore, the preferred electrolyte for electropolymerization is formed from a tetraalkylammonium salt with larger anions, e.g., tetraethylammonium trifluoromethanesulfonate $Et_4NCF_3SO_3$ and tetraethylammonium hexafluorophosphate $Et_4NPF_6$.

For a given electrode substrate, monomer, and electrolyte solution, a strong determinant of electrode morphology is the polymer growth charge. The selection of proper growth charge requires a compromise between smaller growth charges which enable uniform deposition through the carbon paper and thus fast charge/discharge dynamics, and larger growth charges which provide higher energy density. Also, at higher polymer loading, a significant fraction of polymer could be preferentially deposited on the front surface, clogging pores of the carbon paper and thus reducing power density.

Figure 4:
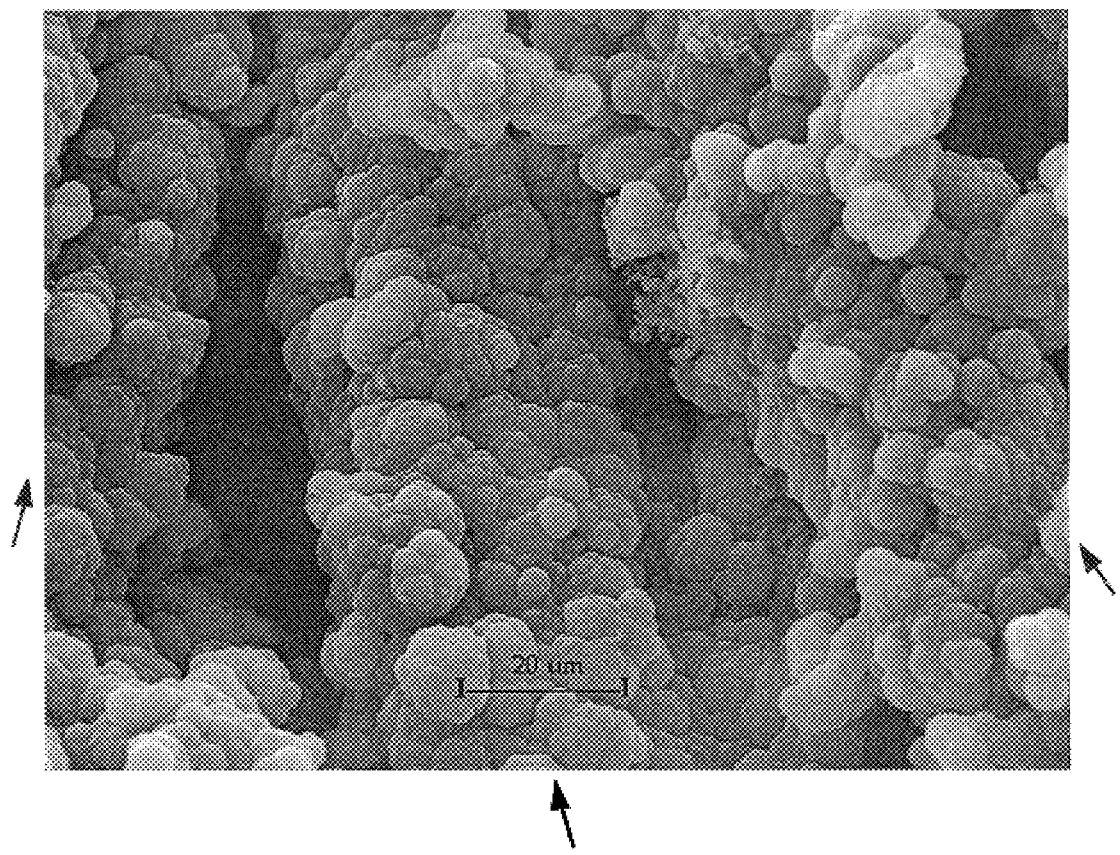
FIG. 4 is a photomicrograph of electrode microstructure for an electrode formed by the electrodeposition apparatus shown in FIG. 3.

In one embodiment of the present invention, a PFPT conducting polymer is electropolymerized galvanostatically onto the carbon paper at 6 mA cm$^{-2}$ to a total growth charge in the range from 5 to 20 C cm$^{-2}$ from a solution of 0.1 M FPT monomer +1 M $Et_4NPF_6$ in acetonitrile. FIG. 4 is an example SEM micrograph showing the morphology of PFPT deposited around carbon fibers under these polymerization conditions. The carbon fiber orientation is along the arrow direction shown in the figure. FIG. 4 is a photomicrograph that illustrates a case where the loading of the deposited PFPT active material is optimized to achieve a high mass ratio of conducting polymer/carbon paper and, at the same time, leave enough residual porosity for ionic transport through the whole volume of the polymer material during charge/discharge cycles. Other exemplary monomers and monomer solutions containing the dimer (3,3"-bithiophene) are described in copending patent application S-91,747, Conducting Polymer for High Power Ultracapacitor, filed concurrently herewith and incorporated herein by reference.

Electropolymerization is performed inside a glove box filled with pure argon. Electrode assembly 34 (FIGS. 2A and 2B) is dried for about 12 hours in a vacuum chamber connected to the glove box. Electrode assembly 34 is then washed in dry acetonitrile before assembly into the working electrode 48 position in electropolymerization cell 40. Following electropolymerization, the deposited polymer is in p-doped state. It is first potentiostatically undoped, then removed from the polymerization cell, and rinsed with a non-aqueous solvent, e.g., acetonitrile. The polymer electrode is then soaked in a non-aqueous solvent, such as acetonitrile, for about 12 hours to remove any possible soluble oligomers trapped in the electrode matrix during electropolymerization. Electrode assembly 34 is then ready for assembly in an ultracapacitor device.

Figure 5C:
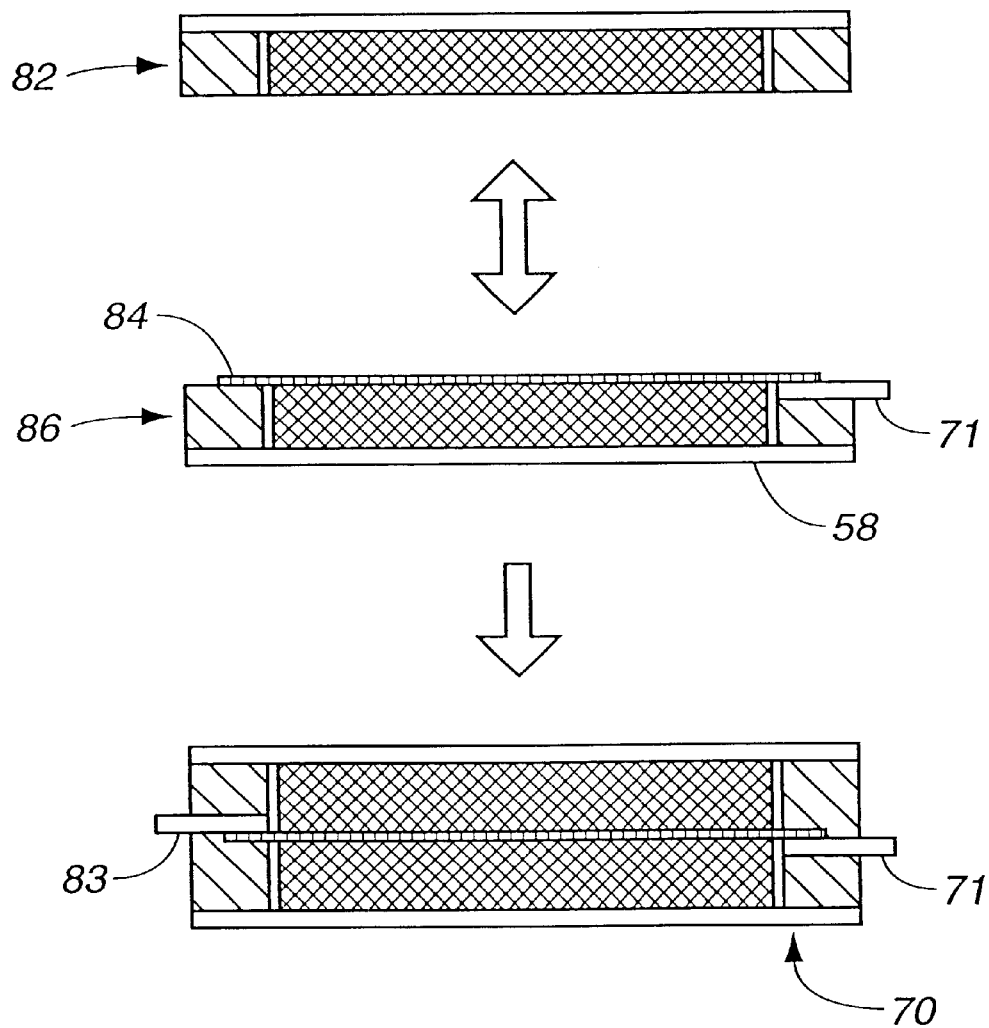
FIG. 5C illustrates the process for completing an ultracapacitor structure according to the present invention.

Once two conducting polymer electrodes are fabricated, a sealed single-cell ultracapacitor can be constructed following the steps illustrated in FIGS. 5A, 5B and 5C. Referring now to FIG. 5A, the first step of cell assembly and packaging is to bond gasket seal ring 72 to the current collector 78 of electrode 74 to produce a electrode seal assembly 80. Gasket seal ring 72 is prepared from heat-sealable thermoplastic material, such as polyolefin film. Seal ring 72 is slightly thicker than the polymer coated carbon paper disc 76 of electrode 74, and has an outer diameter the same as that of the current collector disc 78, and an inner diameter slightly larger than that of the polymer coated carbon paper disc 76. Gasket seal ring 72 is placed on the top of current collector 78 of electrode 74 and aligned along the center of electrode 74.

Sealing between gasket and current collector 78 is accomplished by using a heat-sealing machine (e.g., a machine supplied by JME, Inc.). The central part of the heat sealer is a thin heating ring (not shown) made of tungsten. The heating ring has an inner and outer diameter similar to that of gasket seal ring 72. The electrode assembly 74 to be sealed is aligned over the heat ring. A current pulse, preferably at 20 A for 2 seconds, is applied to heat ring 74 by a timer controlled power supply. This current pulse enables the heat ring to heat up rapidly and causes gasket seal ring 72 to melt. At the same time, compression of electrode current collector 78 against the heat ring base is provided by a gas regulated silicon rubber piston controlled by a timer (not shown). Both the power supply and the piston pressure can be adjusted to accommodate a selected gasket material and thickness. The compression time is programmed to be always longer than the heating time, e.g., remaining compression for at least 2 seconds after heating is complete, to allow the heating ring to cool. Since the insulated heating ring is built on a metal base, this metal base serves as an effective heat sink, allowing the heating ring and sealed electrode 80 to cool down rapidly.

In the above discussed heat sealing process, heating occurs only in the z-direction through the heating ring to the periphery of current collector 78 and then to the gasket 72, so that the electrode active material and structure 76 will not suffer heating. The above heat sealing step results in electrode-seal assembly 80. A second electrode 82 (FIG. 5C) is bonded to the seal in the same way.

Referring now to FIG. 5B, the second step of cell assembly and packaging, is to seal a round porous separator 84 onto the gasket seal ring of the first half sealed electrode 80 and to insert a first electrolyte fill tube 71. Separator 84 has a diameter that is between the inner and outer diameters of gasket seal ring 72 of electrode 80. Before heat sealing separator 84, an electrolyte fill tube 71, e.g., a thin needle is inserted between separator 84 and gasket 72 to position the tube end within gap 75 between gasket 72 and polymer coated carbon paper 76. Heat sealing results in separator covered electrode 86.

The third step of cell assembly and packaging, referring to FIG. 5C, is to bond the two half sealed electrodes 82,86 together into a single cell device 70, and to insert a second electrolyte fill tube 83. The second half sealed electrode 82 is aligned over the first half sealed electrode 86. A second electrolyte fill tube is inserted between them. The assembly is sealed across the gasket rings by the heat sealer (see discussion for FIGS. 5A and 5B), to produce a single cell ultracapacitor device 70.

The next step is to fill electrolyte solution through the two inserted fill tubes 71, 83. One fill tube at one side of separator 84 is used to create a vacuum, the other fill tube at another side of the separator 84 is used to fill the capacitor. Once the capacitor 70 is filled with electrolyte solution, the fill tubes are removed from the capacitor. The fill holes left are sealed by a final step of heat sealing. Alternatively, sealing of the fill holes may be accomplished by various prior art methods, e.g., using a plug seal or a polymer resin.

Finally, lead wires (not shown) may be connected to the two current collectors. The sealed single cell can be further enclosed in a metal or plastic case (not shown) to form a hermetically sealed device.

Figure 6B:
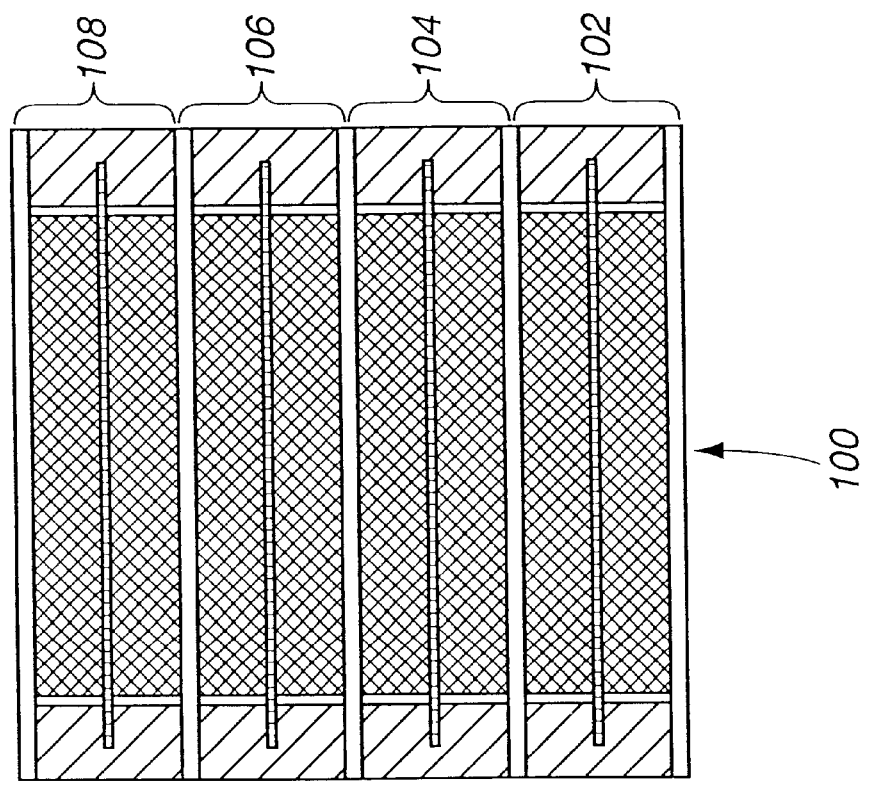
FIGS. 6A and 6B are alternate embodiments of the present invention.
Figure 6A:
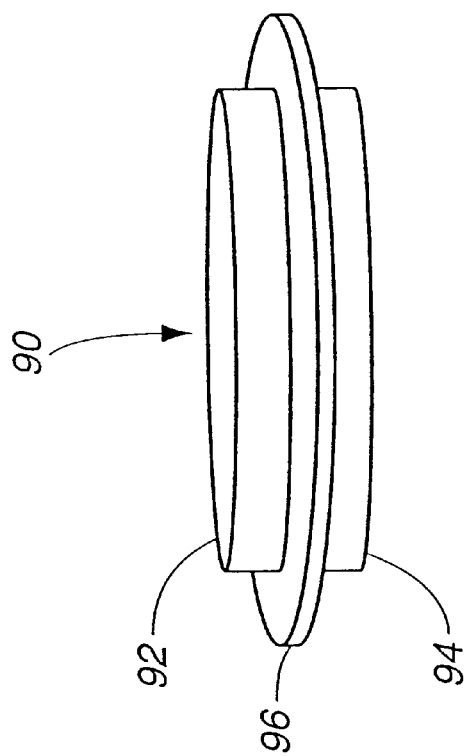

In another embodiment of the present invention, referring to FIGS. 6A and 6B, the capacitor electrode can be fabricated into a bipolar arrangement 90 where two conducting polymer coated carbon paper electrodes 92, 94 are attached on both sides of a "bipolar" current collector 96.

Multi-cell ultracapacitor devices can be fabricated by arranging a plurality of single cells into a bipolar stack in order to provide needed higher voltage (and power). An examplary multi-cell ultracapacitor 100 is shown in FIG. 6B where the bipolar stack consists of four unit cells from 102 to 108. Each cell has a structure the same as that of the single cell 70 in FIG. 5C. In the bipolar stack, each cell is separated from its neighboring cell with a single current collector plate that also acts as an ionic barrier between cells.

This design optimizes the current path through the cell, reduces ohmic losses between cells, and minimizes the weight of packaging due to current collection. The result is an efficient capacitor with high energy and power densities. The construction of a bipolar ultracapacitor will be simpler if the anode and cathode are fabricated from the same conducting polymer active material.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An ultracapacitor assembly comprising:
   first and second porous electrodes formed of first and second conducting polymers electrodeposited within porous carbon paper substrates onto carbon fibers forming the porous carbon paper substrates and defining first and second exterior surfaces and first and second opposing surfaces;
   first and second current collector plates bonded to the first and second exterior surfaces, respectively;
   a porous membrane separating the first and second opposing surfaces;
   a liquid electrolyte impregnating the porous membrane; and
   a gasket formed of a thermoplastic material surrounding the first and second electrodes and sealing between the first and second current collector plates for containing the liquid electrolyte.

2. The ultracapacitor assembly of claim 1, where the first and second conducting polymers are selected from the group consisting of modified polythiophenes where a phenyl, substituted phenyl or other aryl group has been attached to the thiophene backbone in the 3-position.

3. The ultracapacitor assembly of claim 1, where the first and second current collector plates are formed of an electrically conducting film.

4. The ultracapacitor assembly of any one of claims 1, 2, or 3, where the electrolyte is selected from the group consisting of tetraalkylammonium salts of trifluoromethanesulfonate, tetrafluoborate, and hexafluorophosphate.

5. The ultracapacitor assembly of claim 4, wherein the first and second electrodes are formed of the same conducting polymer.

6. The ultracapacitor, assembly of claim 4, wherein the first and second electrodes are formed of different conducting polymers.

* * * * *